United States Patent [19]

Yamada et al.

[11] Patent Number: 4,705,125

[45] Date of Patent: Nov. 10, 1987

[54] METHOD OF AND APPARATUS FOR CONTROLLING HOPPER GATE MOTION

[75] Inventors: Seiji Yamada, Kyoto; Satoshi Konishi, Shiga; Katsuaki Kono, Shiga; Ryoji Nishimura, Shiga, all of Japan

[73] Assignee: Ishida Scales Manufacturing Company, Ltd., Kyoto, Japan

[21] Appl. No.: 931,218

[22] Filed: Nov. 14, 1986

[51] Int. Cl.⁴ .................. G01G 13/16; G01G 13/34; B67D 3/00; B65D 47/00
[52] U.S. Cl. .................................. 177/25; 177/108; 177/112; 222/504; 222/556
[58] Field of Search ............... 177/25.18, 108, 112; 222/504, 505, 556

[56] References Cited

U.S. PATENT DOCUMENTS

| | | | |
|---|---|---|---|
| 1,829,182 | 10/1931 | Beaumont | 222/504 |
| 2,723,058 | 11/1955 | Gardes | 222/504 |
| 3,581,947 | 6/1971 | Jacobson | 222/504 X |
| 4,193,465 | 3/1980 | Henry | 177/108 |
| 4,522,321 | 6/1985 | Kinoshita | 177/25.18 |
| 4,527,647 | 7/1985 | Veda | 177/112 X |
| 4,544,042 | 10/1985 | Mikami | 177/25.18 |
| 4,546,446 | 10/1985 | Kokabu | 177/108 |
| 4,635,831 | 1/1987 | Kinoshita | 177/25.18 X |

Primary Examiner—George H. Miller, Jr.
Attorney, Agent, or Firm—Flehr, Hohbach, Test, Albritton & Herbert

[57] ABSTRACT

A hopper gate of a combinational weighing system is opened and closed by a stepping motor to which pulses are supplied according to a program prepared for a desired action mode such that fine control of the gate motion can be achieved.

16 Claims, 8 Drawing Figures

METHOD OF AND APPARATUS FOR CONTROLLING HOPPER GATE MOTION

BACKGROUND OF THE INVENTION

This invention relates to a combinational weighing system including a method of and apparatus for opening and closing hopper gates and more particularly to a method of and apparatus for accurately controlling the motion of hopper gates by using stepping motors and transmitting pulses to these motors according to a preset program.

In combinational weighing systems actuators of many types have been considered for driving the gate or gates of a hopper which receives the product being weighed. For example, a flapdoor type gate operated by an air cylinder has been disclosed in U.S. Pat. No. 4,522,321. Hoppers which belong to a combinational weighing machine and are opened and closed by a motor have been disclosed, for example, in U.S. Pat. Nos. 4,497,385, 4,520,884 and 4,544,042. These previously considered actuators are primarily intended merely for opening or closing a hopper gate in response to an input signal. In many situations, actuators of this straightforward operating mode are satisfactory but there are applications for which a finer control of the gate motion is desirable. For example, several hoppers are used in a combinational weighing system and, since it is desirable to reduce the time needed for each cycle of combinational weighing, it is desirable to be able to control the motion of each gate more precisely. With a conventional actuator, for example, each hopper gate will be opened or closed almost in an identical manner once a signal is given, irrespective of whether the hopper is nearly full and will take a relatively longer time to discharge all its contents or it is nearly empty and hence can be emptied immediately without even opening the gate completely. Given these circumstances, the operations time of a combinational weighing system cannot be substantially reduced.

As another example, as the linkage in the gate hopper opening mechanism becomes worn from extensive use there is an increase in the mechanical slack between the gate and the pushrod actuator or the like. This results in noisier operation and further loss of speed control.

As still another example, let us consider a combinational weighing system of the type using air cylinders to operate its hopper gates individually. With a system of this type, individual speeds of the hopper gates can be adjusted somewhat but it is difficult to adjust all the hopper gates in the system to operate at a single uniform speed. For this reason, the overall mechanical operation time of the combinational weighing system is conditioned to accommodate the slowest gate. Moreover, characteristics of air cylinders tend to change significantly with service use and systems using them require frequent maintenance operations which are costly and time-consuming.

SUMMARY OF THE INVENTION

It is an object of the present invention to provide in a combinational weighing system a method of and apparatus for opening a hopper gate selectably either completely or partially.

It is another object of the present invention to provide a method of and apparatus for controlling the motion of a hopper gate such that it can close quietly and reduce "slap".

It is still another object of the present invention to provide in a combinational weighing system a method of and apparatus for actuating a hopper gate in a variety of modes by a stepping motor responsive to a preset program.

It is still another object of the present invention to provide a method of and apparatus for causing a hopper gate to undergo a controlled vibratory motion after it is opened to shake off sticky contents.

The above and other objects of the present invention are achieved by using a stepping motor to actuate the hopper gate according to a present program. After desired motion characteristics, such as how gradually the gate should close and whether the gate should be vibrated several times to shake off sticky contents of the hopper after it is opened, are established in terms of gate positions at selected points in time, it can be determined from the known characteristics of the stepping motor what series of pulses should be applied to it to cause the desired motion. This program is stored in a memory means and a computer in the control system executes the program by transmitting pulses according thereto to effect the desired motion.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
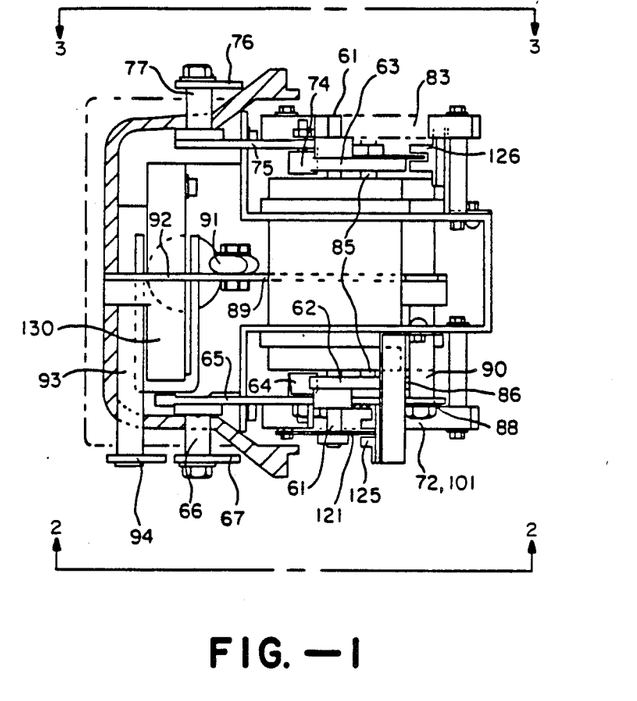
FIG. 1 is a plan view of a hopper-operating mechanism for a combinational weighing system to which the present invention can be applied.
Figure 2:
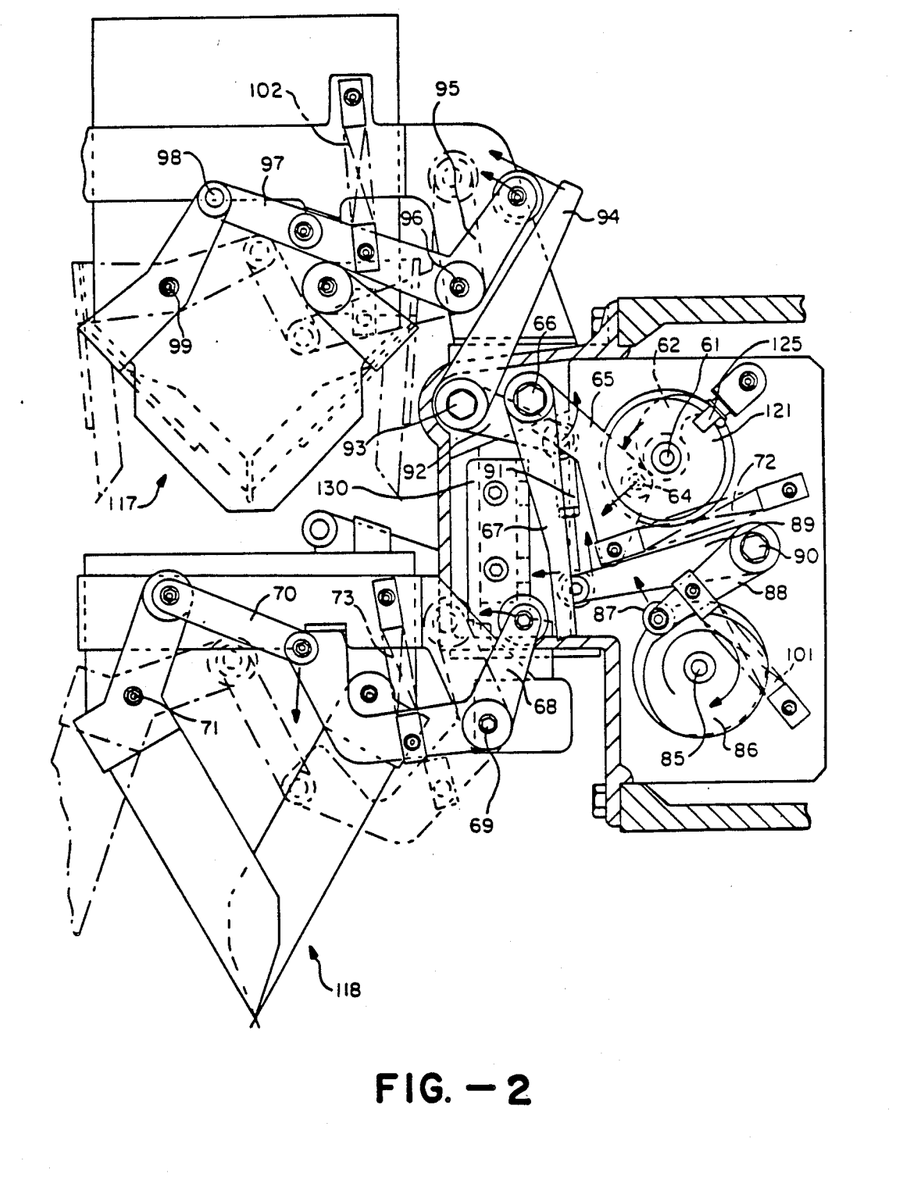
FIG. 2 is a side elevational view taken along the line 2—2 of FIG. 1.
Figure 3:
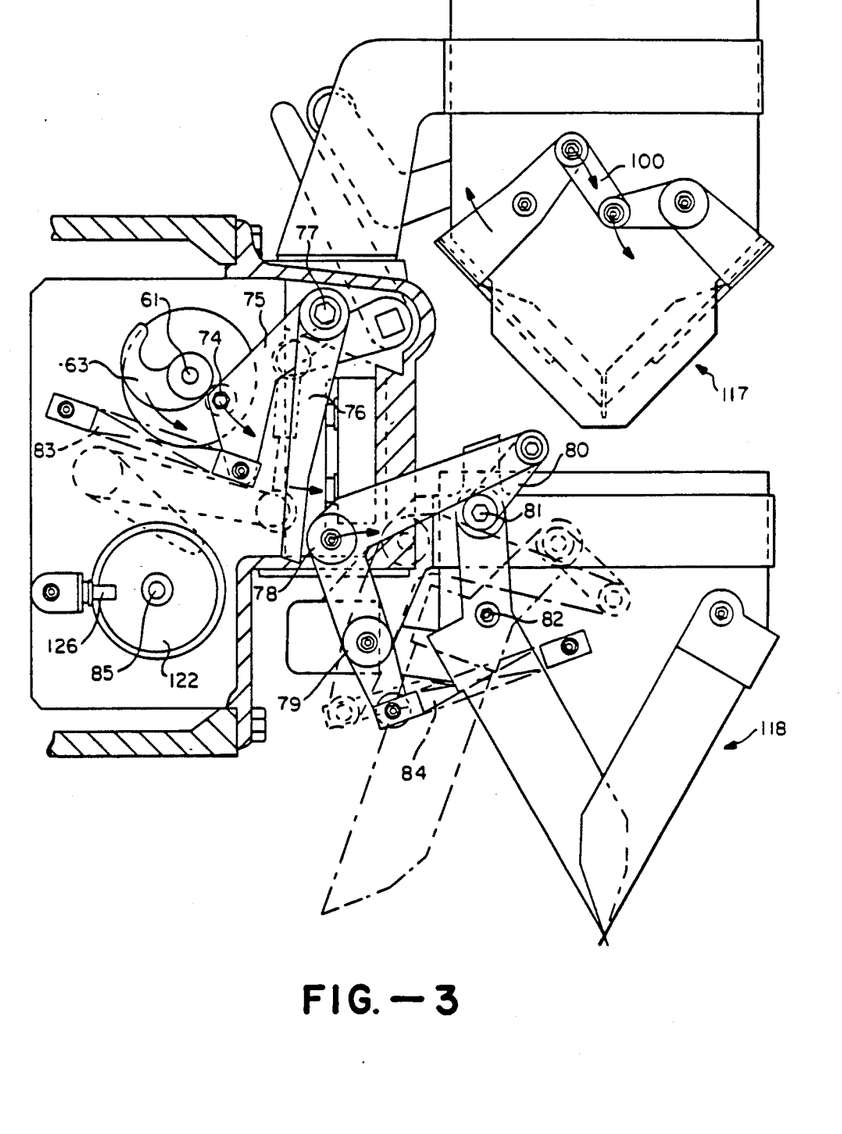
FIG. 3 is another side elevational view taken along the line 3—3 of FIG. 1.

An example of hoppers and mechanisms for operating their gates to which the present invention can be applied is illustrated in FIGS. 1, 2 and 3. FIG. 1 is a partially sectional plan view of a hopper-operating mechanism for one of the article batch handling units of a combinational weighing system. FIGS. 2 and 3 are its side views taken respectively along the lines 2—2 and 3—3 of FIG. 1. Numeral 117 indicates a pool hopper for receiving an article batch and discharging it into a weigh hopper 118 therebelow after temporarily holding it. The associated weigh hopper 118 is for receiving the article batch discharged from the pool hopper 117 thereabove, measuring its weight and then discharging it. Two stepping motors are provided to operate the gates of these hoppers. Numeral 61 indicates the shaft of one of these stepping motors which is for operating the gates of the weigh hopper 118 and numeral 75 indicates the shaft of the other stepping motor for operating the gates of the pool hopper 117.

At one end of the shaft 61, there is secured thereonto a cam 62 for operating the outer gate of the weight hopper 118 as shown in FIG. 2. Similarly, another cam 63 is secured at the other end of the shaft 61 for operating the inner gate of the weigh hopper 118 as shown in FIG. 3. If the shaft 61 is rotated in a counterclockwise direction with respect to FIG. 2 by 180 degree, the cam 62 presses a cam follower 64 and this causes lever members 65 and 67 of a single lever to rotate around an axis 66 in a clockwise direction.

This in turn causes the lever member 67 to push a U-shaped lever 68 to rotate as shown by dotted lines around an axis 69. This motion is transmitted to the outer gate of the weigh hopper 118 through a linking member 70, causing it to rotate around its axis of rotation 71. When the outer gate of the weigh hopper 118 is closed, the associated stepping motor is rotated in the reverse direction around its shaft 61 to bring the cam 62 back to its original position. As the cam 62 is caused to rotate, the lever members 65 and 67 are rotated to the left by the force of a spring 72 and the U-shaped lever 68 is rotated to the right by a spring 73. The inner gate of the weigh hopper 118 is similarly opened and closed. When the shaft 61 is rotated in a counterclockwise direction with respect to FIG. 3 (which is a clockwise direction with respect to FIG. 2) by 180 degree from the position where both inner and outer gates are closed, the cam 63 on the other end of the shaft 61 pushes a cam follower 64 to cause lever member 75 and 76 to rotate around their axis of rotation 77. This causes a roller 78 on an L-shaped lever to rotate to the right around its axis of rotation 79, a link 80 to rotate likewise around a pin 81, and the pin 81 around an axis of rotation 82, as shown by dotted lines. It is to be noted in FIGS. 2 and 3 that the cams 62 and 63 are so shaped that the cam follower 64 will not be pushed by the cam 62 if the shaft 61 turns in a clockwise direction with respect to FIG. 2 and that the cam follower 74 likewise will not be pushed by the cam 63 if the shaft 61 turns in a clockwise direction with respect to FIG. 3. When the inner gate of the weigh hopper 118 is closed, the step motor therefor is rotated backwards and the restoring forces in springs 83 and 84 pull the lever members 75 and 76, the roller 78 and the link 80. The other stepping motor for operating the gates of the associated pool hopper 117 is provided at one end of its shaft 85 with a cam 86 as shown in FIG. 2. When the shaft 85 is rotated by 360 degrees, the cam 86 pushes a cam follower 87 upwards during the first 180 degree-rotation, causing level members 88 and 89 to rotate in a clockwise direction around its axis of rotation 90. Lever members 92 and 94 rotatably connected thereto through a link 91 is thereby caused to rotate around an axis 93 in a counterclockwise direction to push an L-shaped lever 95. When the lever 95 is rotated around an axis 96 in this way, a link 97 is rotated around a pin 98 and the pin 98 around an axis 99 as shown by dotted lines to open the outer gate. If the outer gate is opened, this motion is transmitted through a link 100 to simultaneously open the outer gate. As the cam 88 is rotated further by 180 degrees, springs 101 and 102 pull the cam follower 87 downwards, causing the levers 88, 89, 92 and 94 and the links 91, 97 and 100 to rotate in reverse direction to close the gates. Numerals 121 and 122 indicate disks provided with a slit attached respectively to the shafts 91 and 85 of the stepping motors so that these slits can be detected by photosensors 125 and 126. They are for the purpose of detecting the initial positions of the shaft 61 and 85. Their positioning is usually not required except, for example, after a runaway situation. Numeral 130 indicates a load cell. Although hoppers with two gates each were illustrated above, neither the number of gates per hopper not the mechanical design of power communicating linkage means is intended to limit the scope of the present invention. In what follows, the present invention will be described for the case of a hopper with a single gate for the sake of convenience.

Figure 4:
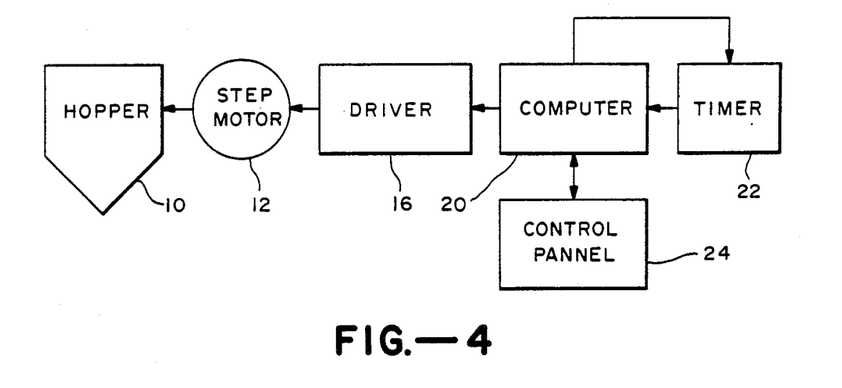
FIG. 4 is a block diagram of a hopper motion controlling apparatus according to the present invention.

FIG. 4 is a block diagram of an apparatus embodying the present invention for controlling the operation of a hopper gate. The hopper 10 is powered by a stepping motor (also called a pulse motor or a stepper motor) 12 which, for example, may be Model PH268-21B manufactured by Oriental Motor Kabushiki Kaisha of Osaka, Japan or Model PH299-03B by the same manufacturer and used in the combinational weighing machine Model CCW-L manufactured and sold by the assignee corporation and described in U.S. patent application Ser. No. 787,325 filed Oct. 15, 1985 and assigned to the present assignee. The motor 12 is operated by pulses provided through a driver means 16 according to a program stored in a computer 20. (Memory devices belonging to the computer 20 are herein considered as parts of the computer 20.) As will be explained below, the program is written as a time sequence of pulses to be provided to the motor 12 and for this and other reasons, a timer 22 is also controlled by the computer 20 and the computer 20, in turn, executes the program by making reference to the timer output. A control panel 24 including a key input device and a display device is connected to the computer 20.

Let us assume for the sake of illustration that the step motor 12 is so designed that the hopper gate comes to a half-open position after the motor 12 is driven for 100 pulses and that the gate becomes fully open with 200 pulses. If it is desired to operate the motor 12 to open and close the hopper 10, for example, as shown by a solid line in FIG. 2, then in one program the motor 12 starts abruptly and turns at a constant rate for a first time period $t_1$ (such as 60 ms), then gradually decelerates for a second time period $t_2$ (such as 30 ms) until the gate comes to the half-open position, then remains stationary for a third time period $t_3$ (such as 80 ms) with the gate at the half-open position, then gradually accelerates in the reverse direction for a fourth period of time $t_4$ (such as 30 ms), then rotates in the reverse direction at a constant rate for a fifth period of time $t_5$ (such as 50 ms) and then gradually decelerates from this reverse rotation for a sixth period $t_6$ (such as 50 ms) until the gate closes completely to complete a cycle of operation over a total period of 300 ms. A similar program may of course be considered for opening the gate completely and then bringing it to the closed position quietly as indicated by a dotted line in FIG. 5.

On the basis of the desired mode of operation described above and indicated by the solid line in FIG. 5, one can prepare a program as shown in Table 1 for transmitting pulses to the motor 12. The first line of Table 1 shows, for example, that during the aforementioned first time period $t_1$, the motor is rotated in the direction defined to be positive while the timer 22 counts 89 pulses of period 0.67 ms. The following four lines in Table 1 describe how the deceleration in the second period $t_2$ is effected, that is, the deceleration is not uniform but is carried out as a series of four constant-speed motions.

TABLE 1

| Pulse Period $T_i$ (in ms) | Number of Pulses $P_i$ | Direction of Rotation $F_i$ | i |
|---|---|---|---|
| 0.67 | 89 | + | 1 |
| 1.2 | 5 | + | 2 |
| 2.0 | 3 | + | 3 |
| 4.0 | 2 | + | 4 |
| 10.0 | 1 | + | 5 |
| 80.0 | 1 | o | 6 |
| 10.0 | 1 | − | 7 |
| 4.0 | 2 | − | 8 |
| 2.0 | 3 | − | 9 |
| 1.2 | 4 | − | 10 |
| 0.625 | 80 | − | 11 |
| 1.3 | 3 | − | 12 |
| 2.0 | 3 | − | 13 |
| 5.0 | 2 | − | 14 |
| 10.0 | 1 | − | 15 |
| 20.0 | 1 | − | 16 |

Figure 5:
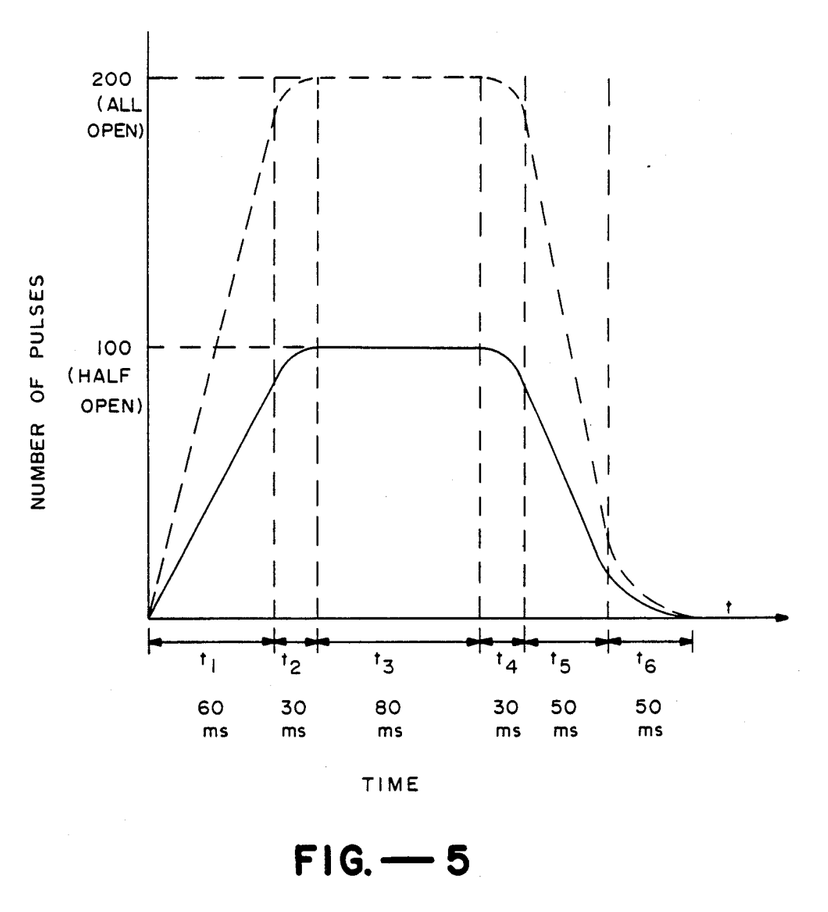
FIG. 5 is an example of motion diagram for the opening and closing of a hopper gate.

After a program for opening the gate to a half-open position is completed as shown in Table 1, parameters $T_i$, $P_i$ and $F_i$ respectively representing the pulse period, the number of pulses and the direction of rotation in the ith period of operation are stored in the computer 20 through the input-output means 24. The computer 20 then asks the user, advantageously by writing questions on the display means (not shown), how wide the gate should be opened (for example, 100% for opening completely and 50% for opening to the half-open position) and how long it should take to open and close the gate (for example, 100% for a cycle with the aforementioned period of 300 ms as shown in FIG. 5). If the user responds with 100% to both these questions (that is, the gate is fully opened and closed within 300 ms), the computer 20 creates a working program on the basis of Table 1 by multiplying $P_i$ Table 1 by 2 and dividing $T_i$ of Table 1 by 2. If the user wants to open the gate 75% with the same period of time, $T_i$ of Table 1 are likewise multiplied by ¾ and $P_i$ by 4/3. If it is desired to double the period and the user responds with 200% to the second question, the computer 20 multiplies $T_i$ by 2 with $P_i$ remaining unchanged. After the working program is thus created, incorporating the input by the user, the computer 20 stores it in its memory means and causes the driver means 16 to operate the step motor 12 according to this stored working program.

Operation of the program shown by Table 1 by the computer 20 is explained next by way of a flow chart shown in FIG. 6. After dummy indices P and i, representing the second and fourth columns of Table 1, are set to 0 and 1, respectively (n1), it is examined if the end of the program has been reached (n2), the end of the program being represented by i=17 because Table 1 contains 16 periods (i=1-16). Corresponding to the first line of Table 1 (i=1), the computer 20 reads the entry $T_1=0.67$ ms and starts the timer 22 after setting this value therein (n3). When the specified time period has been counted by the timer 22 (YES in n4), the sign of $F_1$ is checked (n5). Finding that the motor 12 must be rotated in the positive direction in the first period, the computer 20 prepares a pulse for causing the stepping motor 12 to rotate by one step in the positive direction and transmits it to the driver means 16 (n6). It also counts the number of times such a pulse is transmitted (n7) until the counted value reaches the desired number of pulses for this period ($P_1=89$) according to the program (n8). When the dummy index (counter) P reaches 89, it is the end of the first period (i=1) and the program enters the second period represented by the second line of Table 1 by resetting P and increasing i by 1 (n9).

Thereafter, the same routine is followed for each of the subsequent periods. In the sixth period where $F_6=0$ (YES in n10), it goes without saying that no pulse is transmitted to the driver means 16. In the periods where $F_i$ is negative, it also goes without saying that pulses are created for causing the stepping motor 12 to rotate by one step in the negative direction (n11). By the end of the sixteenth period (YES in n2), the hopper gate has been opened and closed with the desired motion characteristics as shown in FIG. 5.

There are many advantageous ways in which the present invention can be applied. Since the stepping motor according to the present invention can be controlled by a variety of programs, the gate can be opened as quickly as possible, for example, to increase the speed of discharge. Alternatively, the gate can be exponentially accelerated and decelerated at the beginning and end so as to reduce the noise of impact caused by sudden movements.

When sticky articles are being handled by the hopper, as another example, it may be found advantageous to cause the gate to execute a vibratory motion with a small amplitude over a predetermined short period of time after the gate has been opened. This can be accomplished by reversing the direction of rotation of the step motor a predetermined number of times to move the gate back and forth.

Figure 8:
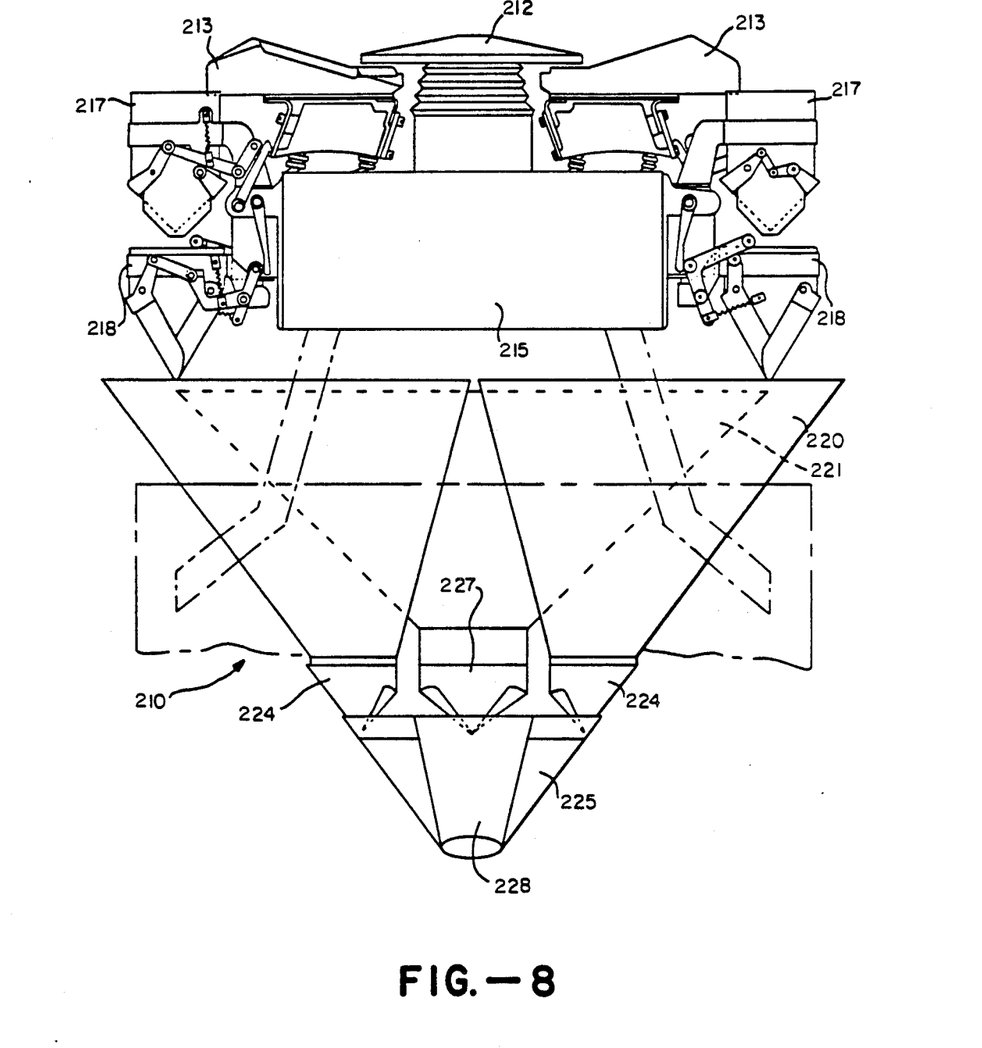
FIG. 8 is a side elevational view of a principal part of a combinational weighing system which incorporates the hopper-operating mechanism shown in FIGS. 1-3.

FIG. 8 shows an example of combinational weighing system 210 which can utilize the method and apparatus of the present invention. Combinational weighing means weighing articles by a plurality of weighing devices, performing arithmetic operations for combinations of measured weight values and then selecting a combination according to a predetermined criterion. The major features of combinational weighing are great accuracy and high throughput. Many types of combinational weighing systems have been manufactured and sold by the present assignee corporation. With reference to FIG. 8, the articles to be weighed are transported by a conveyor means (not shown) and dropped onto a dispersion table 212 which is a circular table with a lightly inclined conical top surface so that the articles dropped thereonto from the conveyor means can be made to disperse uniformly in radial directions. A plurality of feed troughs 213 each with an article receiving end and an article delivering end are arranged in a circular formation around the dispersion table 212 with their article receiving ends adjacent thereto. Both the dispersion table 212 and the feed troughs 213 are supported on a system housing 215 preferably through individual vibration-causing means (not shown) which serve to cause vibrational motion of the articles thereon. The feed troughs 213 are disposed radially and serve to deliver the articles to be weighed into the individual article batch handling units associated therewith. Each article batch handling unit includes a pool hopper 217 serving to receive an article batch from the feed trough 213 associated with the article batch handling unit to which it belongs and to discharge the same article batch into a weigh hopper 218 belonging to the same article batch handling unit and situated immediately therebelow. Each weigh hopper 218 is connected to a weighing device (not shown) such as a load cell and serves momentarily to hold the article batch received from the pool hopper 217 thereabove. The weight values measured by the load cells are electrically transmitted to a control unit (not shown) which includes a computer. Control units for combinational weighing systems have been disclosed, for example, in U.S. Pat. Nos. 4,396,078, 4,399,880 and 4,491,189. Computer algorithms for selecting a combination have also been disclosed in these references and incorporated in products produced and sold by the assignee corporation. The lower part of the system 210 is comprised of a chute assembly. According to the embodiment shown in FIG. 8, the chute assembly includes a funnel-shaped outer chute 220 coaxially surrounding a funnel-shaped inner chute 221 in such a way that they form two separate discharge routes. At the bottom end, the outer chute 220 is divided into two separate passages where it is connected to left-hand and right-hand timing hoppers 224 which are, in turn, connected to a lower chute 225 so that the articles discharged into the outer chute 220 join together. At the bottom of the inner chute 221 is provided another timing hopper 227 which is connected to a second lower chute 228. The system 210 described above, however, is but one example of combinational weighing system to which the present invention can be applied and hence is not intended to limit the scope of the invention.

In the case of such a combinational weighing system having many article batch handling units, each including one or more hoppers, one program may be established for all hoppers or the system may be so designed that the hoppers can be programmed individually. In the latter case, the hoppers are identified, for example, by different identification numbers and the user is requested to specify an identification number in addition to how wide its gate should be opened and how long it should take to open and close the gate as described above. It is particularly advantageous to be able to operate different hoppers by different programs in the case of a combinational weighing system of the type described in U.S. Pat. Nos. 3,939,928 and 4,494,619, which is based on the principle that articles can be charged more efficiently by being divided into two groups than by being vibrated and pressed in one batch. Such a system would have two weighing apparatus, one weighing and discharging a number of articles which have a total weight smaller than a target weight and the other thereafter correcting the weight of the remaining articles. Since articles are generally supplied to these two apparatus and discharged therefrom in different amounts and at different speeds, the overall efficiency of the system can be improved by specifying individually optimum modes of operation for these hoppers.

Figure 6:
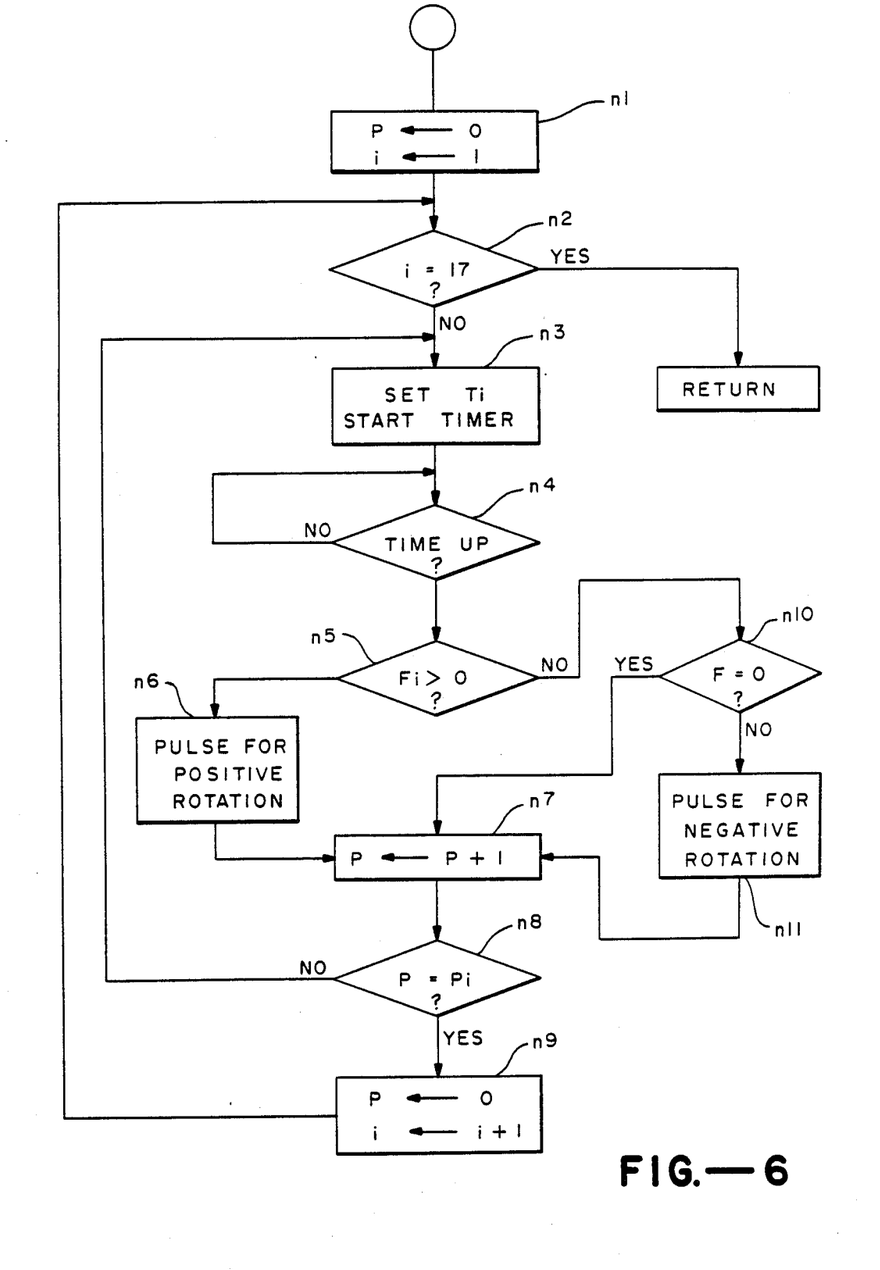
FIG. 6 is a flow chart of operation for opening and closing a hopper gate by providing pulses to a stepping motor.

In the case of a weigh hopper including a weighing means such as a load cell to measure the weight of its contents, furthermore, a lever of the like for actually communicating the gate-opening force from the stepping motor 12 to the hopper gate must be separated from the hopper during the weighing process, or when the gate is completely closed as illustrated, for example, in FIG. 6 of the aforementioned U.S. Pat. No. 4,520,884. A predetermined clearance, therefore, is left between such a lever and a roller or the like on which the lever applies a force to open the gate. For this reason, there is generally a delay between the time when a command signal is received for opening the gate and the time at which the lever comes in contact with the roller and the gate actually begins to open. With conventional gate-opening mechanisms, this delay in time has been one of the problems in the attempt to reduce the overall weighing time. This delay in the response, however, can be eliminated as follows by the method and apparatus of the present invention. Although there is left a predetermined clearance between the lever and the roller as explained above while the gate is closed during a weighing process, the stepping motor is driven by a very small number of steps as soon as the weighing is completed so that the lever moves and comes to a point where it lightly touches the roller without actually opening the gate. This can be done because there is usually a play of about 3 mm in the linkage mechanism for communicating force. After the measured weight is used in combinational computation and the hopper is selected in the combination, the stepping motor associated with the hopper can start opening its gate without any delay because the lever is already in contact with the roller. When the gate is closed, the stepping motor is rotated in the reverse direction to separate the lever from the roller by a predetermined distance such that the hopper is ready for the next weighing operation.

Figure 7:
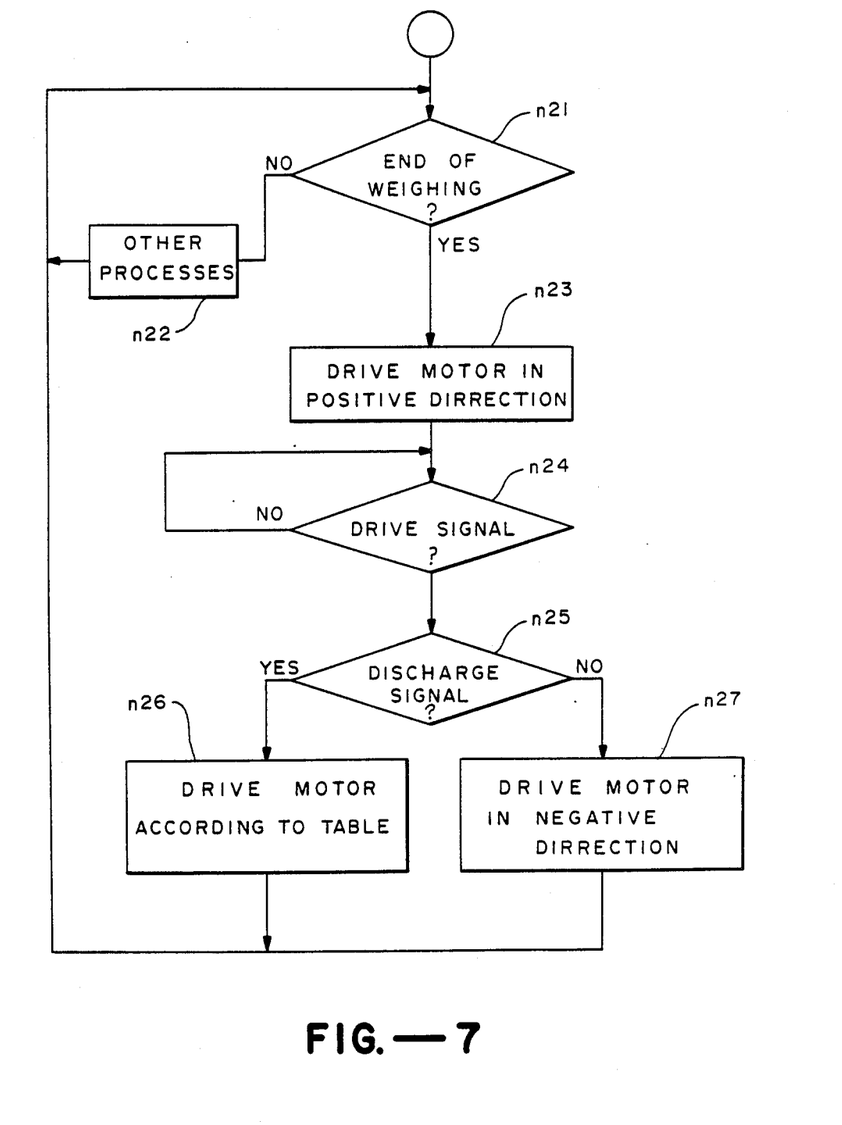
FIG. 7 is a flow chart of operation for opening and closing a weigh hopper gate.

Such control can be effected easily by starting with an action curve of the type illustrated in FIG. 5 and then preparing a program as illustrated in Table 1. FIG. 7 is an illustrative flow chart for the aforementioned operation of a weigh hopper. While the weighing takes place (NO in n21), the control system is engaged in other operations (n22) but as soon as the weighing is completed, the stepping motor is rotated by a predetermined number of steps until the lever touches the roller without opening the gate (n23). Thereafter, the system waits for a drive signal (n24). If the hopper has been selected as a result of combinational computation and a discharge signal is received (YES in n25), the gate is opened to discharge the articles contained therein and then is closed according to the program shown in FIG. 3 or Table 1 (n26). If the hopper was not selected and did not receive a discharge signal (NO in n25), the stepping motor is rotated in the reverse direction to separate the lever from the roller (n27). The flow chart of FIG. 4, however, is merely intended as an example of programming and is not intended to limit the present invention.

Additional advantages of the present invention include adjustability of the maximum angle to which each gate is opened, depending on the amount of articles which are contained in the hopper. As a result, the speed of weighing can be freely changed according to the amount of supplied articles. Since the motion characteristics of the gate can be easily changed through an input device, there is increased freedom in the design and all kinds of articles can be supplied and discharged in manners best suited for their individual characteristics. When sticky articles are being handled, as mentioned above, the gate can be made to vibrate after it is opened such that errors in measurement caused by articles which failed to be discharged can be usually eliminated.

The present invention is conveniently utilized in the type of combinational weighing programs where different hoppers discharge at different times as disclosed in U.S. Pat. No. 4,460,880, or where the article supplying section is separated into partitions such that different kinds of articles to be weighed are supplied as disclosed in U.S. Pat. No. 4,549,617. Since each action mode of the gate can be stored in memory means as data, many programs representing different action modes, each suited to a particular type of articles to be weighed, can be stored such that the user can select the best mode of action, depending on the conditions such as the target weight, and call the corresponding program to operate the hopper gates as shown in U.S. Pat. No. 4,553,616.

The foregoing description of a preferred embodiment of the invention has been presented for purposes of illustration and description. It is not intended to be exhaustive or to limit the invention to the precise form disclosed, and many modifications and variations are possible in light of the above teaching. For example, the present invention can be applied to a hopper with one gate or with two gates although the description of the control unit given above was for the case of a single-gate hopper for the sake of convenience. The timer 22 may be an external timer rather than an internal software timer. If it is an external timer, Step n4 of FIG. 6 will be replaced by an interrupt. Such modifications and variations which may be apparent to a person skilled in the art are intended to be included within the scope of this invention.

What is claimed is:

1. A method of controlling the motion of a hopper gate actuated by a stepping motor, said method comprising the steps of
    selecting a mode of opening and closing motion of said hopper gate in terms of positions thereof at selected times,
    forming a program by determining a sequence of pulses to be applied to said stepping motor so as to execute said mode of motion by said hopper gate, and
    transmitting pulses to said stepping motor according to said program.

2. The method of claim 1 further comprising the step of storing said program in a memory means.

3. The method of claim 1 wherein said program causes said gate to gradually accelerate to a maximum speed and to gradually decelerate to stop said gate.

4. The method of claim 1 wherein said program causes said gate to vibrate a predetermined number of times after opening.

5. An apparatus for controlling the motion of a hopper gate comprising
    control means for sequentially transmitting a series of pulse signals according to a program, and
    driving means for moving said hopper gate by an angle and in a direction in response to each of said pulse signals.

6. The apparatus of claim 5 wherein said driving means include a stepping motor.

7. The apparatus of claim 5 wherein said control means include a computer.

8. The apparatus of claim 5 wherein said control means include memory means which store said program.

9. The apparatus of claim 5 wherein said program causes said gate to gradually accelerate to a maximum speed and to gradually decelerate to stop said gate.

10. The apparatus of claim 5 wherein said program causes said gate to vibrate a predetermined number of times after opening.

11. The apparatus of claim 5 wherein said control means include an input device through which said program can be modified.

12. The apparatus of claim 6 wherein said stepping motor has a shaft with a cam secured thereonto, said driving means further including a cam follower, which is disposed so as to be pushed by said cam, linkage means connected in motion-communicating relationship to said cam follower and to said gate, and spring means applying biasing force to keep said gate closed.

13. In a combinational weighing system comprising
    a plurality of article batch handling units each serving to receive an article batch, to output a weight value signal indicative of the weight of said article batch, and to discharge said article batch in response to a discharge signal, each article batch handling unit including one or more hoppers with gates, and
    a control means serving to periodically carryout combinational computation on the basis of inputted weight values, to thereby select at least one combination of article batch handling units and to output discharge signals to said selected article batch handling units,
    the improvement wherein said control means controls the motion of said gate by sequentially transmitting a series of pulse signals according to a preset program, and wherein each of said gates is moved by an angle and in a direction in response to each of said pulse signals.

14. The combinational weighing system of claim 13 wherein each of said gates is operated by a stepping motor.

15. The combinational weighing system of claim 13 wherein said control means include memory means which store said program.

16. The combinational weighing system of claim 13 wherein said program operates each of said gates individually.

* * * * *